United States Patent
Tian et al.

(10) Patent No.: US 10,313,985 B2
(45) Date of Patent: Jun. 4, 2019

(54) WIRELESS COMMUNICATION DEVICE FOR CONTROLLING A TARGET TRANSMISSION POWER OF A TARGET CELL USING A CLASSIFICATION OF AN OVERALL CHANNEL QUALITY IN A CELL CLUSTER

(71) Applicant: SONY CORPORATION, Tokyo (JP)

(72) Inventors: Hui Tian, Beijing (CN); Qimei Cui, Beijing (CN); Meng Wang, Beijing (CN); Zhilin Li, Beijing (CN); Yang Liu, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/122,557

(22) PCT Filed: Mar. 5, 2015

(86) PCT No.: PCT/CN2015/073702
§ 371 (c)(1),
(2) Date: Aug. 30, 2016

(87) PCT Pub. No.: WO2015/143976
PCT Pub. Date: Oct. 1, 2015

(65) Prior Publication Data
US 2017/0078981 A1    Mar. 16, 2017

(30) Foreign Application Priority Data

Mar. 28, 2014  (CN) .......................... 2014 1 0123043

(51) Int. Cl.
*H04W 72/04*  (2009.01)
*H04W 52/26*  (2009.01)
*H04W 52/24*  (2009.01)

(52) U.S. Cl.
CPC ......... *H04W 52/265* (2013.01); *H04W 52/24* (2013.01); *H04W 52/241* (2013.01); *H04W 52/244* (2013.01); *H04W 72/044* (2013.01)

(58) Field of Classification Search
CPC ... H04L 5/0057; H04L 5/0007; H04L 5/0035; H04L 5/006; H04L 1/20; H04W 72/042;
(Continued)

(56) References Cited

U.S. PATENT DOCUMENTS

2010/0238815 A1* 9/2010 Kohout ............... H04L 43/0817
370/252
2011/0136533 A1   6/2011 Senarath et al.
(Continued)

FOREIGN PATENT DOCUMENTS

| CN | 10800578 A | 8/2010 |
|---|---|---|
| CN | 101931993 A | 12/2010 |
| CN | 102907146 A | 1/2013 |

OTHER PUBLICATIONS

International Search Report dated Jun. 8, 2015 in PCT/CN2015/073702 filed Mar. 5, 2015.

*Primary Examiner* — Sai Aung
(74) *Attorney, Agent, or Firm* — XSENSUS LLP

(57) ABSTRACT

A wireless communication device, a wireless communication method and a wireless communication system. The wireless communication device includes: a classification unit, used for, based on the channel qualities of downlinks of a target cell and other cells in a cell cluster on a specific resource block, classifying the overall condition of the channel quality; and a control unit, used for controlling, so as to determine the target transmitting power of the target cell on the specific resource block by using a power distribution method adapting to the classification. According to the scheme, the system throughput of a wireless network on (Continued)

the specific resource block under dense cell distribution can be maximized.

14 Claims, 11 Drawing Sheets

(58) Field of Classification Search
CPC ........... H04W 72/0413; H04W 72/085; H04W 72/0473; H04W 72/082; H04W 52/241; H04W 28/0236; H04W 28/0268; H04W 36/30; H04W 40/12
See application file for complete search history.

(56) References Cited

U.S. PATENT DOCUMENTS

| | | | |
|---|---|---|---|
| 2012/0115498 A1 | 5/2012 | Kim et al. | |
| 2015/0358104 A1* | 12/2015 | Ohwatari | H04B 7/0456 370/252 |
| 2015/0382222 A1* | 12/2015 | Park | H04L 1/00 370/252 |
| 2016/0127069 A1* | 5/2016 | Nuss | H04W 16/10 370/329 |
| 2016/0295525 A1* | 10/2016 | Zhu | H04B 7/0617 |

* cited by examiner (a)

(b)

WIRELESS COMMUNICATION DEVICE FOR CONTROLLING A TARGET TRANSMISSION POWER OF A TARGET CELL USING A CLASSIFICATION OF AN OVERALL CHANNEL QUALITY IN A CELL CLUSTER

FIELD

The disclosure generally relates to the technical field of wireless communication, and in particular to a wireless communication device, a wireless communication method and a wireless communication system, which can perform an efficient power control between cells.

BACKGROUND

In order to further solve the problem of data service requirement of a wireless cellular network, 3GPP (The 3rd Generation Partnership Project) proposed, in the latest LTE-A evolution version Release 12, a solution for denser small cell deployment. By deploying small cells, a system throughput can be improved, a more effective coverage can also be provided, so as to realize a load balancing. In a whole LTE-A network, the small cells are mainly deployed in the following three scenarios: deployed with a frequency same as a macro base station, deployed with a frequency different from a macro base station, or deployed without a macro base station. In a scenario of being deployed in the frequency different from the macro base station, the small cell operates with a frequency different from the macro base station, and thus cross-layer interference between the macro base station and the small cell may be ignored, which is consistent with the research method for the scenario of deployment without a macro base station. Therefore, from a perspective of network interference analysis, the small cell deployment may be classified into two types: a same-frequency deployment with only cross-layer interference between the small cell and the macro base station, and a different-frequency deployment with only same-layer interference. And the different-frequency deployment of the small cell is a hotspot in 3GPP research.

Although a dense small cell deployment can greatly improve the spectrum efficiency of a network, it may bring serious same-layer interference, and increase the operation cost. In another aspect, interference of a small cell network, especially interference in a dense deployment, is a bottleneck of a further improvement of system performance. Therefore, interference management and energy efficiency are currently research focuses of a small cell project group of 3GPP. In a case of the different-frequency deployment, that is, in a case that the cross-layer interference between the macro base station and the small cell is not taken into account, the dense deployment of small cells may make a user equipment be interfered by many other small cells at the same time. Therefore, the same-layer interference is a main constraint on system performance improvement.

SUMMARY

A wireless communication device is provided according to an aspect of the present disclosure. The wireless communication device includes: a classification unit, configured to classify, based on channel qualities of downlinks of a target cell and other cells in a cell cluster on a specific resource block, an overall channel quality; and a control unit, configured to perform a control to determine a target transmission power of the target cell on the specific resource block by a power allocating method adaptive to a classification of the overall channel quality.

A wireless communication method is provided according to another aspect of the present disclosure. The wireless communication method includes: classifying, based on channel qualities of downlinks of a target cell and other cells in a cell cluster on a specific resource block, an overall channel quality; and performing a control to determine a target transmission power of the target cell on the specific resource block by a power allocating method adaptive to a classification of the overall channel quality.

A wireless communication device is provided according to another aspect of the present disclosure. The wireless communication device includes: a classification unit, configured to classify a user equipment in a cell cluster based on average channel quality of downlinks to the user equipment in a predetermined time period; an allocating unit, configured to allocate a resource block set to the user equipment at least partly based on a classification of the user equipment, wherein the allocating unit allocates a same resource block set to user equipments of the same classification; and a control unit, configured to perform a control to determine a target transmission power of a target cell on a specific resource block by a power allocating method adaptive to a classification of the user equipment scheduled by the target cell on the specific resource block.

A wireless communication method is provided according to another aspect of the present disclosure. The wireless communication method includes: classifying a user equipment in a cell cluster based on average channel quality of downlinks to the user equipment in a predetermined time period; allocating a resource block set to the user equipment at least partly based on a classification of the user equipment, wherein the allocating unit allocates a same resource block set to user equipments of the same classification; and performing a control to determine a target transmission power of a target cell on a specific resource block by a power allocating method adaptive to a classification of the user equipment scheduled by the target cell on the specific resource block.

A wireless communication system is further provided according to anther aspect of the present disclosure. The wireless communication system includes the wireless communication device according to the present disclosure.

With the wireless communication device and the wireless communication method according to the present disclosure, a system throughput of a wireless network on a specific resource block in a dense small cell deployment can be maximized.

BRIEF DESCRIPTION OF THE DRAWINGS

The above and other objectives, features and advantages will be more easily understood with reference to the following descriptions of embodiments of the present disclosure in conjunction with the drawings. In the drawings, same or corresponding reference numerals indicate same or corresponding technical features or parts. In the drawings, sizes and relative positions of units may not be drawn to scale.

DETAILED DESCRIPTION OF EMBODIMENTS

Figure 1:
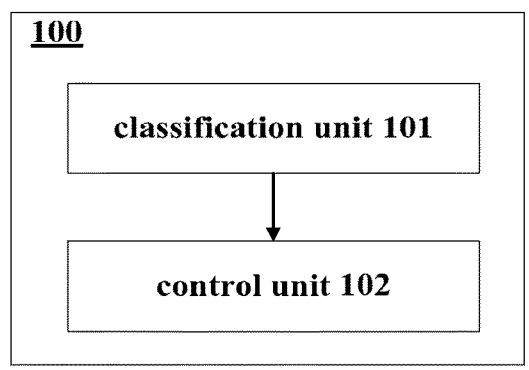
FIG. 1 is a block diagram illustrating a functional configuration of a wireless communication device according to an embodiment of the present disclosure.

In the following, embodiments of the present disclosure are described in conjunction with the drawings. It should be noted that, for clarity, representations and descriptions of parts and processes, which are independent of the present disclosure and known by those skilled in the art, are omitted in the drawings and the descriptions.

A high efficient power control solution is provided by the present disclosure, for a scenario of different-frequency deployment of small cell, so as to improve a system throughput. Specifically, in an embodiment, with a wireless communication device and a wireless communication method according to the present disclosure, transmission power is determined in a corresponding manner based on an overall channel quality of downlinks of a cell on which a transmission power control is to be performed (also referred to as "target cell" hereinafter) in a cell cluster and other cells (also referred to as "non-target cell" hereinafter) in the cell cluster on a specific resource block.

FIG. 1 is a block diagram illustrating a functional configuration of a wireless communication device 100 according to an embodiment of the present disclosure. The wireless communication device 100 may be arranged independently as a controller controlling transmission power of all cells in a cell cluster, or arranged in each of cells in the cell cluster, or arranged in a specified cell.

The wireless communication device 100 includes a classification unit 101 and a control unit 102. The classification unit 101 is configured to classify, based on channel qualities of downlinks of a target cell and other cells in a cell cluster on a specific resource block, an overall channel quality. For example, the classification unit 101 may classify the overall channel quality as good, normal, bad. The channel quality of the downlinks of respective cells in the cell cluster on the specific resource block may be characterized with any conventional indicators or parameters in the art. And the overall channel quality may be classified according to a predetermined classification criterion, for example, by comparing these indicators or parameters with thresholds predetermined based on practical experiences. In the present disclosure, for example, the channel quality may be characterized with signal to interference plus noise ratios (SINRs) fed back by user equipments (UE) which occupy the specific resource block and are within coverage ranges of the respective cells.

It is assumed that in a certain network scenario, a cell cluster includes N cells $SC_n$ (n=1, 2, ..., N). S resource blocks (RBs) are shared by the cells in the cell cluster and an RB of one cell can only be occupied by one user equipment. A user equipment served by a target cell $CS_i$ and scheduled on a resource block k is represented with $UE_i^k$, and the SINR of $UE_i^k$ is represented with $\gamma_i^k$. Similarly, a user equipment served by a non-target cell $CS_j$ (j=1, 2, ..., N and j≠i) and scheduled on the resource block k is represented with $UE_j^k$, and the SINR of $UE_j^k$ is represented with $\gamma_j^k$. Then the classification unit 101 may be configured to: classify an overall channel quality of downlinks of the cell cluster on the resource block k as good in a case that $\gamma_i^k$ and $\gamma_j^k$ are both much greater than 1(>>1); classify the overall channel quality of the downlinks of the cell cluster on the resource block k as bad in a case that $\gamma_i^k$ and $\gamma_j^k$ are both much less than 1(<<1); and classify the overall channel quality as normal in other cases.

In an embodiment, the classification unit 101 may classify the overall channel quality based on predetermined thresholds. For example, for pre-stored thresholds Th1=0.5 and Th2=5, the classification unit 101 may be configured to: classify the overall channel quality of the downlinks of the cell cluster on the resource block k as good in a case that $\gamma_i^k>5$ and $\gamma_j^k>5$, where it is considered that $\gamma_i^k$ and $\gamma_j^k$ are both much greater than 1; classify the overall channel quality as bad in a case that $\gamma_i^k<0.5$ and $\gamma_j^k<0.5$, where it is considered that $\gamma_i^k$ and $\gamma_j^k$ are both much less than 1; and classify the overall channel quality as normal in other cases.

The control unit 102 performs a control to determine transmission power $p_i^k$ by a power allocating method adaptive to a classification determined by the classification unit 101, as a target transmission power of the target cell $CS_i$ on the specific resource block k. In view of different system requirements such as a requirement of maximizing a system throughput or a requirement of ensuring an accurate reception of a signal transferred under a bad channel quality, the control unit 102 may be configured to determine the target transmission power of the target cell $CS_i$ on the specific resource block k by different power allocating methods. For example, in a case that it needs to be ensured that user equipments can reliably receive downlink signals under a bad overall channel quality of downlinks of cells in a cell cluster on a certain resource block, the control unit 102 may be configured to determine power allocations for the target cell on respective resource blocks in such a way that power determined with a power determination method used for a resource block with channel quality of downlinks classified as "bad" is higher than that determined with a power determination method used for a resource block with channel quality of downlinks classified as "good". The specific method may be determined by those skilled in the art as needed.

Figure 2:
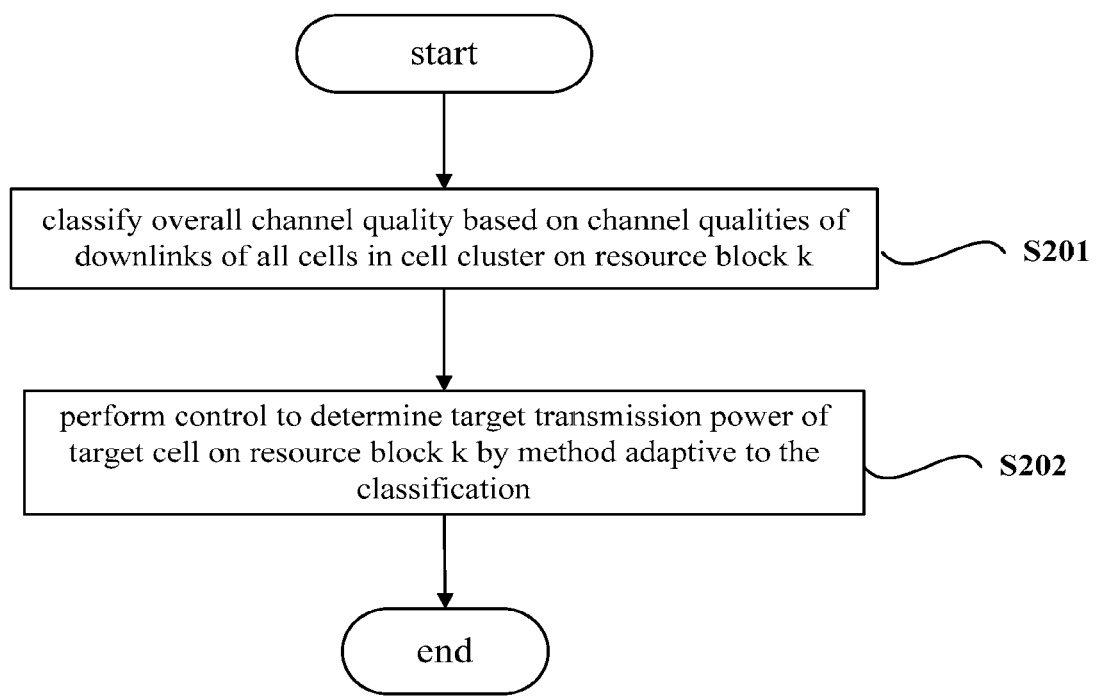
FIG. 2 is a flowchart illustrating a process of a wireless communication method according to an embodiment of the present disclosure.

FIG. 2 is a flowchart illustrating a process of a wireless communication method according to an embodiment of the present disclosure. In step S201, based on channel qualities of downlinks of a target cell $CS_i$ and other cells $CS_j$ (j=1, 2, ..., N and j≠i) in a cell cluster on a specific resource block k, an overall channel quality is classified by a wireless communication device 100 according to the present disclosure. For example, the wireless communication device 100 may classified the overall channel quality based on acquired SINRs $\gamma_n^k$ (n=1, 2, ..., N) fed back to a cell base station from user equipments UEs in the cell cluster which occupy the resource block k. The SINRs $\gamma_n^k$ may be used to characterize the channel quality of the downlinks of the respective cells on the resource block k.

For example, in step S201, the overall channel quality may be classified as good, normal, bad. For example, the overall channel quality may be determined by determining the relations ("much greater", "much less" and the like) of SINRs of the target cell and other cells and 1. Whether it is "much greater" or "much less" may be determined with a predetermined threshold. The details thereof are omitted herein as they have already been described above.

In step S202, a control is performed such that a target transmission power of the target cell $CS_i$ on the specific resource block k is determined by a power allocating method adaptive to the classification of step S201. The Power allocating methods adaptive to different classifications may be designed based on system requirements, which have been described briefly above by examples. Hereinafter, an embodiment of a power allocating solution designed for maximizing a system throughput is described in detail with reference to FIGS. 3 to 5.

Figure 3:
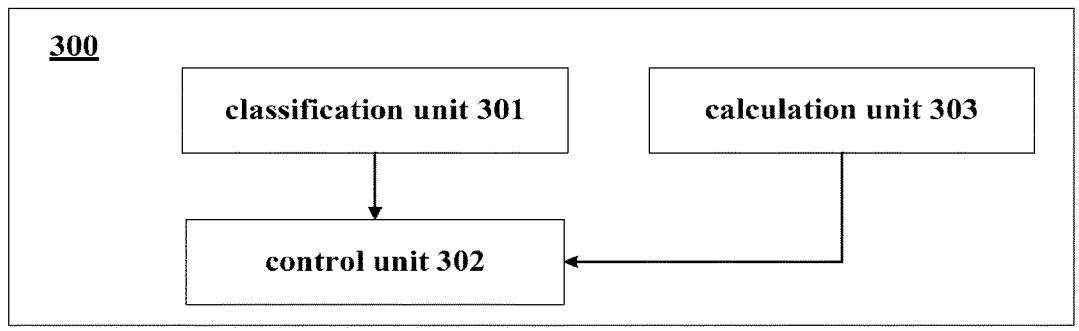
FIG. 3 is a block diagram illustrating a functional configuration of a wireless communication device according to an embodiment of the present disclosure.

FIG. 3 is a block diagram illustrating a functional configuration of a wireless communication device 300 according to an embodiment of the present disclosure. The wireless communication 300 includes a classification unit 301, a control unit 302 and a calculation unit 303. Functions and structures of the classification unit 301 are the same as those of the classification unit 101 described in conjunction with FIG. 1, which are not described in detail hereinafter.

The calculation unit 303 calculates inter-cell SINR of a target cell $CS_i$ with regard to a respective non-target cell $CS_j$ (j=1, 2, ..., N and j≠i) on a specific resource block k, which is referred to as "inter-cell SINR" hereinafter. The inter-cell SINR is defined as a ratio of interference of the target cell on a certain non-target cell versus a sum of all interference and noise the non-target cell is subjected to, on a certain resource block. An inter-cell SINR $\lambda_{i,j}^k$ of the target cell $CS_i$ (a cell to be allocated with power) with regard to a user equipment $UE_j^k$ scheduled by the non-target cell (a cell other than the target cell) $CS_j$ on the resource block k may be represented with the following formula (1):

$$\lambda_{i,j}^k = \frac{p_i^k g_{i,j}^k}{I(p_{-j}^k) + \sigma^2} \quad (1)$$

where $p_i^k$ represents the transmission power of the target cell $CS_i$ on the resource block k, and $g_{i,j}^k$ represents a channel gain from the target cell $CS_i$ to the user equipment $UE_j^k$ of the non-target cell $CS_j$. Therefore, the numerator $p_i^k g_{i,j}^k$ represents the interference on the user equipment $UE_j^k$ by a transmission of the cell $CS_i$, i.e. the received power of the transmission of the cell $CS_i$ at the user equipment $UE_j^k$, which may be obtained by the user equipment $UE_j^k$ via a measurement. In addition, $I(p_{-j}^k)$ represents the interference on the non-target cell $CS_j$ from all other cells in the cell cluster on the resource block k, and $\sigma^2$ represents all noises the non-target cell $CS_j$ is subjected to. $I(p_{-j}^k)$ may be calculated according to the following formula (2):

$$I(p_{-j}^k) = \sum_{n \neq j, n=1}^{N} p_n^k g_{n,j}^k \quad (2)$$

It can be seen that, $I(p_{-j}^k)$ is a sum of received powers of transmissions of all the cells other than the non-target cell $CS_j$ at the user equipment $UE_j^k$, on the resource block k. Similarly, the received power may be obtained by the user equipment $UE_j^k$ via a measurement.

In an actual implementation, the value of $I(p_{-j}^k)$ may not be calculated exactly. The denominator of formula (1) indicates a sum of power of interference and noises, i.e., useless power. Therefore, the denominator can be obtained as long as the user equipment $UE_j^k$ reports its SINR and the received power of its serving base station. This manner is more simple and accurate than a calculation with formula (2).

After calculating the inter-cell SINR of the target cell $CS_i$ with regard to each non-target cell $CS_j$ on the resource block k, the calculation unit 303 may further calculate a sum of the inter-cell SINRs of the target cell $CS_i$ with regard to all of the non-target cells $CS_j$ (j=1, 2, ..., N and j≠i). The sum may be represented as $$\sum_{j \neq i} \lambda_{i,j}^k.$$

And the calculated sum of the inter-cell SINRs, $$\sum_{j \neq i} \lambda_{i,j}^k,$$

may be used in the power allocating solution described below.

In order to maximize the system throughput, the control unit 302 is configured to perform a control to determine a target transmission power of the target cell on the specific resource block by a power allocating method adaptive to a classification made by the classification unit 301.

Specifically, the control unit 301 may be configured to determine whether the sum of the inter-cell SINRs, $$\sum_{j \neq i} \lambda_{i,j}^k,$$

is less than 1, in a case that the overall channel quality is classified as good, for example, when $\gamma_i^k$ an $\gamma_j^k$ are both much greater than 1. If it is determined that the sum of the inter-cell SINRs is not less than 1, the target transmission power may be determined by decreasing, by a certain step length, the transmission power of the target cell $CS_i$ on the resource block k. In addition, in some embodiments, if it is determined by the control unit 302 that the sum of the inter-cell SINRs is less than 1, the target transmission power of the target cell $CS_i$ on the resource block may be determined by making a first-order partial derivative of a total throughput $R^k$ of all cells in the cell cluster on the specific resource block k with respect to the transmission power $p_i^k$ of the target cell $CS_i$ on the resource block k equal to 0.

In the following, description is to be made in conjunction with specific formulas. In the network scenario assumed in the above, the total throughput $R^k$ of all of the cells in the cell cluster on the resource block k may be represented with, for example, formula (3):

$$R^k = \sum_{i=1}^{N} \log_2 \left( 1 + \frac{p_i^k g_{i,i}^k}{\sum_{j \neq i, j=1}^{N} p_j^k g_{j,i}^k + \sigma^2} \right) \quad (3)$$

where meanings of superscripts and subscripts of parameters are similar to those described in the above and thus are not described repeatedly herein. In an embodiment in which a quality of downlinks is represented with a SINR, first-order and second-order partial derivatives of $R^k$ with respect to the transmission power $p_i^k$ may be represented with formula (4) and formula (5):

$$\frac{\partial R^k}{\partial p_i^k} = \frac{1}{1+\gamma_i^k} \cdot \frac{g_{i,i}^k}{I(p_{-i}^k) + \sigma^2} + \sum_{j \neq i}^{N} \frac{1}{1+\gamma_j^k} \left( -\frac{p_j^k g_{j,j}^k}{(I(p_{-j}^k) + \sigma^2)^2} \right) \cdot g_{i,j}^k = \quad (4)$$

$$\frac{\gamma_i^k}{p_i^k(1+\gamma_i^k)} - \sum_{j \neq i}^{N} \frac{g_{i,j}^k (\gamma_j^k)^2}{p_j^k g_{j,j}^k (1+\gamma_j^k)}, \; p_i^k \neq 0 \text{ and } p_j^k \neq 0$$

$$\frac{\partial^2 R^k}{\partial (p_i^k)^2} = \left[ -\frac{1}{(1+\gamma_i^k)^2} \cdot \frac{g_{i,i}^k}{I(p_{-i}^k) + \sigma^2} \right] \cdot \frac{g_{i,i}^k}{I(p_{-i}^k) + \sigma^2} - \quad (5)$$

$$\sum_{j \neq i}^{N} \frac{g_{i,j}^k}{p_j^k g_{j,j}^k} \cdot \frac{2\gamma_j^k(1+\gamma_j^k) - (\gamma_j^k)^2}{(1+\gamma_j^k)^2} \left[ -\frac{p_j^k g_{j,j}^k}{(I(p_{-j}^k) + \sigma^2)^2} \right] \cdot g_{i,j}^k =$$

$$-\frac{(\gamma_i^k)^2}{(p_i^k)^2(1+\gamma_i^k)^2} + \sum_{j \neq i}^{N} \left( \frac{g_{i,j}^k}{p_j^k g_{j,j}^k} \right)^2 \frac{(\gamma_j^k)^4 + 2(\gamma_j^k)^3}{(1+\gamma_j^k)^2},$$

$$p_i^k \neq 0 \text{ and } p_j^k \neq 0$$

Formula (4) and formula (5) may be simplified in a case that the overall channel quality is classified as good, i.e. $\gamma_i^k$ and $\gamma_j^k$ are both much greater than 1 (generally, $\gamma_i^k$ and $\gamma_j^k$ are both much greater than 1 in a case that the overall channel quality of the downlinks is good). In addition, by substituting the inter-cell SINR $\lambda_{i,j}^k$, the first-order and second-order partial derivatives of the total throughput $R^k$ with respect to $p_i^k$ may be converted into:

$$\frac{\partial R^k}{\partial p_i^k} \approx \frac{1}{P_i^k} - \sum_{j \neq i}^{N} \frac{g_{i,j}^k \gamma_j^k}{p_j^k g_{j,j}^k} = \frac{1 - \sum_{j \neq i}^{N} \lambda_{i,j}^k}{p_i^k} \quad (6)$$

$$\frac{\partial^2 R^k}{\partial (p_i^k)^2} \approx -\frac{1}{(P_i^k)^2} + \sum_{j \neq i}^{N} \left( \frac{g_{i,j}^k \gamma_j^k}{p_j^k g_{j,j}^k} \right)^2 \quad (7)$$

$$= -\frac{1}{(P_i^k)^2} + \sum_{j \neq i}^{N} \left[ \frac{g_{i,j}^k}{I(p_{-j}^k) + \sigma^2} \right]^2$$

$$= \frac{\sum_{j \neq i}^{N} (\lambda_{i,j}^k)^2 - 1}{(P_i^k)^2}$$

Figure 4:
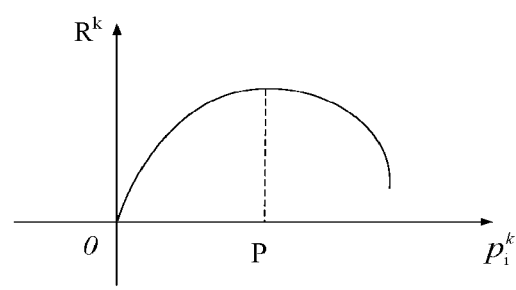
FIG. 4 is a schematic diagram illustrating a variation characteristic that a total throughput of a network varies with a transmission power of a target cell in a case that an overall channel quality is good.
Figure 4:
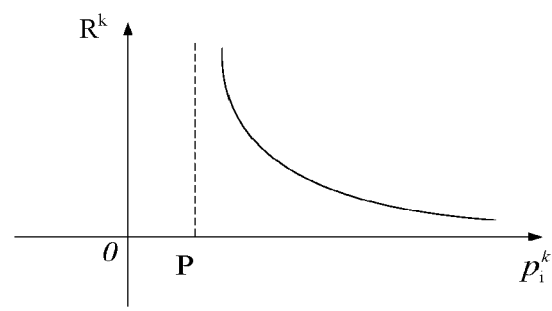

With formulas (6) and (7), the variation characteristic of a total throughput of the network varying with the transmission power of the target cell may be obtained. FIG. 4 is a schematic diagram illustrating the variation characteristic of the total throughput of the network varying with the transmission power of the target cell in a case that $\gamma_i^k$ and $\gamma_j^k$ are both much greater than 1.

If the sum of the inter-cell SINRs, $$\sum_{j \neq i}^{N} \lambda_{i,j}^k,$$

is less than 1

$$\left( \text{i.e. } \frac{\partial R^k}{\partial p_i^k} > 0 \right),$$

then $\lambda_{i,j}^k < 1$ for any values of j. Then $$\sum_{j \neq i}^{N} (\lambda_{i,j}^k)^2$$

is less than 1, $$\frac{\partial^2 R^k}{\partial (p_i^k)^2} < 0.$$

It can be seen that, $R^k(p_i^k)$ is a convex function, as shown in (a) of FIG. 4. Therefore, when $$\frac{\partial R^k}{\partial p_i^k} = 0, R^k(p_i^k)$$

has an optimum solution, which is represented by "P". Otherwise, if the sum of inter-cell SINRs $$\sum_{j \neq i}^{N} \lambda_{i,j}^k,$$

is not less than 1, then the function $R^k(p_i^k)$ is a concave function, as shown in (b) of FIG. 4, of which an optimum solution can not obtained directly.

Similarly, in a case that the overall channel quality is classified as bad, for example, in a case that the channel quality is represented with a SINR and $\gamma_i^k$ and $\gamma_j^k$ are both much less than 1 (i.e. $\gamma_i^k \ll 1$ and $\gamma_j^k \ll 1$), it may be deduced that $$\frac{\partial R^k}{\partial p_i^k} > 0 \text{ and } \frac{\partial^2 R^k}{\partial (p_i^k)^2} < 0$$

based on formulas (4) and (5). Therefore, an optimum solution of $R^k(p_i^k)$ may also be obtained when $$\frac{\partial R^k}{\partial p_i^k} = 0.$$

Therefore, the control unit 302 may be configured to perform a control to, in a case that the overall channel quality is classified as bad, determine the target transmission power of the target cell $CS_i$ on the resource block k by making the first-order partial derivative of the total throughput $R^k$ of all of the cells in the cell cluster on the resource block k with respect to the transmission power $p_i^k$ of the target cell $CS_i$, on the resource block k equal to 0.

In a case that the overall channel quality is normal, for example, in a case that when the channel quality are represented by $\gamma_i^k$ and $\gamma_j^k$, $\gamma_i^k$ and $\gamma_j^k$ are neither both much less than 1 nor both much greater than 1, it is difficult to directly determine the variation characteristic of $R^k(p_i^k)$ based on the SINRs $\gamma_i^k$ and $\gamma_j^k$ and the sum of inter-cell SINRs, $$\sum_{j \neq i}^{N} \lambda_{i,j}^k.$$

Therefore, the variation characteristic of $R^k(p_i^k)$ may be obtained by directly calculating the first-order and second-order partial derivatives of $R^k$ with respect to $p_i^k$ by, for example, formula (4) and formula (5), and comparing them with 0 respectively.

In an embodiment, the calculation unit 303 may have the following function: compare values of the first-order and second-order partial derivatives of the total throughput $R^k$ of all of the cells in the cluster on the resource block k with respect to the transmission power $p_i^k$ of the target cell $CS_i$, on the resource block k, $$\frac{\partial R^k}{\partial p_i^k} \text{ and } \frac{\partial^2 R^k}{\partial (p_i^k)^2},$$

with 0, and provide the comparison result to the control unit 302. The control unit 302 may be configured to perform a control to determine the target transmission power of the target cell $CS_i$ on the resource block k by making the first-order partial derivative $$\frac{\partial R^k}{\partial p_i^k} = 0,$$

in a case that the overall channel quality is classified as normal and it is determined by the calculation unit 303 via the comparison that the value of the first-order partial derivative $$\frac{\partial R^k}{\partial p_i^k}$$

is greater than 0 and the value of the second-order partial derivative $$\frac{\partial^2 R^k}{\partial (p_i^k)^2}$$

is less than 0. In addition, the control unit 302 may be further configured to perform a control to determine the target transmission power by decreasing, by a certain step length, the transmission power of the target cell $CS_i$ on the resource block k, in a case that the overall channel quality is classified as normal and it is determined by the calculation unit 303 via the comparison that the value of the first-order partial derivative $$\frac{\partial R^k}{\partial p_i^k}$$

is less than 0.

In the following, taking an embodiment of integrating (implementing) the wireless communication device 300 into (as) a cell base station as an example, a data transfer between a user equipment and a cell base station in a wireless communication system using a power allocating solution according to the present disclosure is described in conjunction with FIG. 5.

Figure 5:
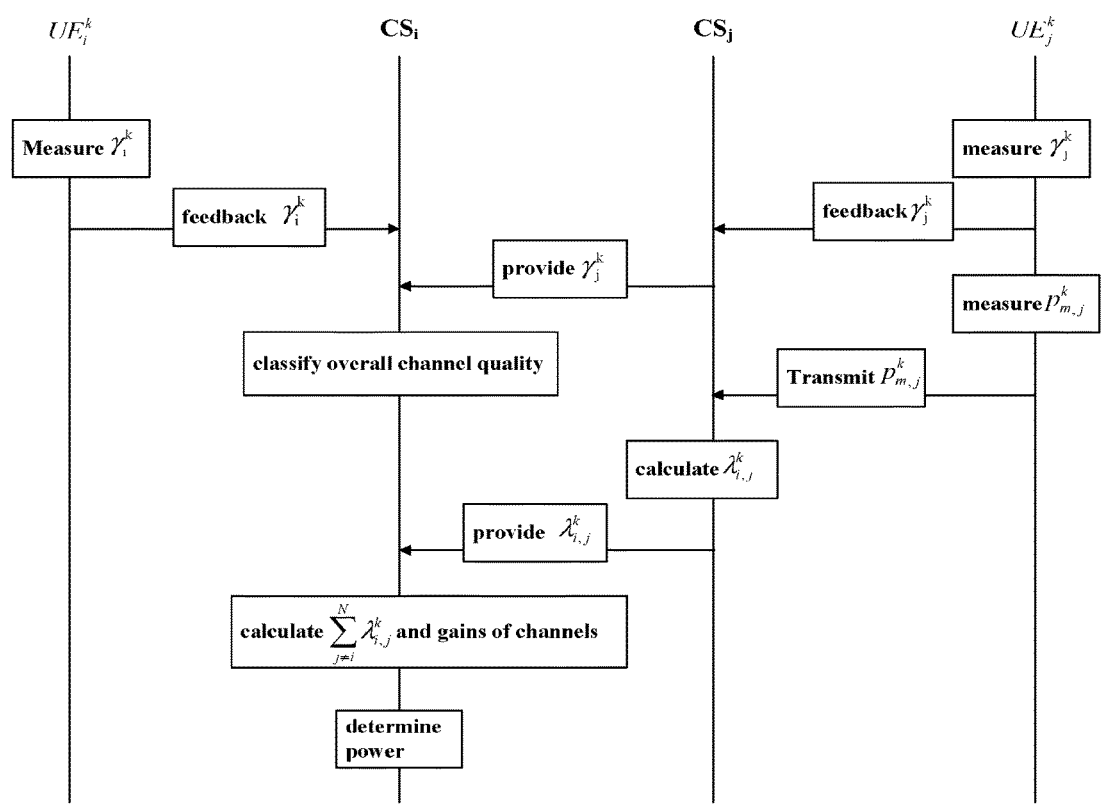
FIG. 5 is a sequence diagram illustrating a data transfer between a user equipment and a cell base station in a case that a wireless communication device according to an embodiment of the present disclosure is integrated into the cell base station.

FIG. 5 is a sequence diagram illustrating a data transfer between a user equipment and a cell base station in a case that the wireless communication device 300 according to the embodiment of the present disclosure is integrated into the cell base station.

It can be seen from the above analysis that, the wireless communication device 300 needs to acquire the following contents to select a proper power allocating solution: SINRs $\gamma_n^k$ (n=1, 2, . . . , N) of the cells in the cell cluster on the resource block k, and inter-cell SINRs $\lambda_{i,j}^k$ (referred to as "inter-cell SINR" hereinafter) of the target cell $CS_i$ with respect to all of the other cells $CS_j$ (j=1, 2, . . . , N and j≠i) on the resource block k.

Here, the SINR $\gamma_n^k$ may be obtained by feeding back from user equipments to their serving cells and interactions between cells. For example, in FIG. 5, user equipments $UE_i^k$ in the target cell scheduled on the resource block k and $UE_j^k$ in other cells scheduled on the resource block k measure SINRs of their serving cells on the resource block k, $\gamma_i^k$ and $\gamma_j^k$, and feedback $\gamma_i^k$ and $\gamma_j^k$ to base stations of their serving cells. In the embodiment, the non-target cell $CS_j$ provides its SINR $\gamma_j^k$ to the target cell $CS_i$. Then, the wireless communication device 300 included in the base station of the target cell $CS_i$ may classify an overall channel quality of downlinks on the resource block k.

In addition, it can be seen from definition formulas (1) and (2) of inter-cell SINR $\lambda_{i,j}^k$ that, interferences on the cell $CS_j$ by all cells other than the cell $CS_j$ on the resource block k, i.e. received power $p_{m,j}^k$ (m=1, 2, ..., N and m≠j) received by the user equipment $UE_j^k$ respectively from all the cells other than the cell $CS_j$, $p_{m,j}^k = p_m^k g_{m,j}^k$, needs to be acquired to calculate $\lambda_{i,j}^k$. In FIG. 5, the user equipment $UE_j^k$ measures $p_{m,j}^k$ and delivers $p_{m,j}^k$ to a base station of the cell $CS_j$. Then, the inter-cell SINR $\lambda_{i,j}^k$ may be calculated in the base station of the cell $CS_j$ according to formulas (1) and (2) using all of received power $p_{m,j}^k$ (m=1, 2, ..., N and m≠j) received. Then, the cell $CS_j$ provides $\lambda_{i,j}^k$ to the cell $CS_i$ for the wireless communication device 300 included in the base station of the target cell $CS_i$ to calculate the sum of inter-cell SINRs, $$\sum_{j \neq i}^{N} \lambda_{i,j}^k.$$

In a case that the overall channel quality is classified as normal, it is needed to compare respectively, with zero, the values of the first-order and second-order partial derivatives of the total throughput $R^k$ of all the cells in the cell cluster on the resource block k with respect to the transmission power $p_i^k$ of the target cell $CS_i$ on the resource block k, $$\frac{\partial R^k}{\partial p_i^k} \text{ and } \frac{\partial^2 R^k}{\partial (p_i^k)^2}.$$

Therefore, it can be seen from formulas (4) and (5) that, the wireless communication device 300 needs to further obtain channel gains $g_{i,j}^k$, $g_{i,i}^k$ and $g_{j,j}^k$. It can be appreciated by those skilled in the art that these gains may be obtained in various known manners, for example, by calculating a ratio of transmission power versus corresponding received power.

After obtaining sufficient data, the wireless communication device 300 included in the target cell $CS_i$ may determine a target transmission power with a corresponding method. In a case that the method in which the first-order derivative $$\frac{\partial R^k}{\partial p_i^k} = 0$$

is adopted to determine the target transmission power, the following deduced formula (8) may be adopted:

$$\frac{\partial R^k}{\partial p_i^k} = \frac{1}{1+\gamma_i^k} \cdot \frac{g_{i,i}^k}{I(p_{-i}^k)+\sigma^2} + \sum_{j \neq i}^{N} \frac{1}{1+\gamma_j^k} \left( -\frac{p_j^k g_{j,j}^k}{(I(p_{-j}^k)+\sigma^2)^2} \right) \cdot g_{i,j}^k \quad (8)$$

$$= \frac{\gamma_i^k}{1+\gamma_i^k} \cdot \frac{1}{p_i^k} - \frac{1}{p_i^k} \sum_{j \neq i}^{N} \frac{\gamma_j^k}{1+\gamma_j^k} \cdot \lambda_{i,j}^k$$

$$= 0 \Rightarrow \frac{\gamma_i^k}{1+\gamma_i^k}$$

$$= \sum_{j \neq i}^{N} \frac{\gamma_j^k}{1+\gamma_j^k} \cdot \lambda_{i,j}^k \Rightarrow p_i^k$$

$$= \frac{A}{H(1-A)}, \text{ where } A = \sum_{j \neq i}^{N} \frac{\gamma_j^k}{1+\gamma_j^k} \cdot \lambda_{i,j}^k, H = \frac{g_{i,i}^k}{I(p_{-i}^k)+\sigma^2}$$

where meanings of symbols are the same as or similar to those described in the above, and thus are not described herein.

It should be noted that, the timing sequence of measuring, feeding back and providing related parameters and the timing sequence of operations of classification, calculation and determination, etc., shown in FIG. 5 are only examples without intending to limit the present disclosure, and can be adjusted in any ways as needed. In addition, a subject performing the operations such as classification, calculation and determination may be changed as needed. For example, the inter-cell SINR may be directly calculated by the user equipment or may be all calculated in the base station of the target cell.

With the wireless communication device and the wireless communication method corresponding to the operations performed by the wireless communication device described above, a target transmission power of a target cell on a specific resource block may be determined by a power allocating method adaptive to a classification of an overall channel quality of downlinks on the specific resource block, thereby maximizing a system throughput of a wireless network on the specific resource block in a dense small cell deployment.

Figure 6:
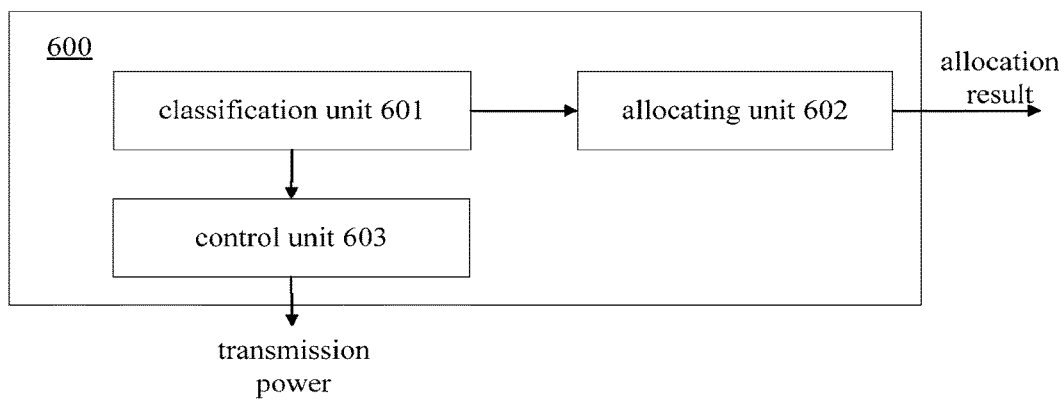
FIG. 6 is a block diagram illustrating a functional configuration of a wireless communication device according to an embodiment of the present disclosure.

In the following, another embodiment according to the present disclosure is described in conjunction with FIGS. 6 to 10. FIG. 6 is a block diagram illustrating a functional configuration of a wireless communication device 600 according to an embodiment of the present disclosure. The wireless communication device 600 includes a classification unit 601, an allocating unit 602 and a control unit 603.

The classification unit 601 is configured to classify a user equipment UE (classifying the user equipment into different types) based on average channel quality of downlinks to the user equipment UE in a cell cluster in a predetermined time period. The average channel quality of the user equipment UE in the predetermined time period may be acquired by using any type of data capable of indicating the channel quality of the downlink. The average channel quality of the downlink to the user equipment UE in the predetermined time period may be characterized by, for example, but not limited to, an average SINR of the user equipment UE in the predetermined time period.

Figure 7:
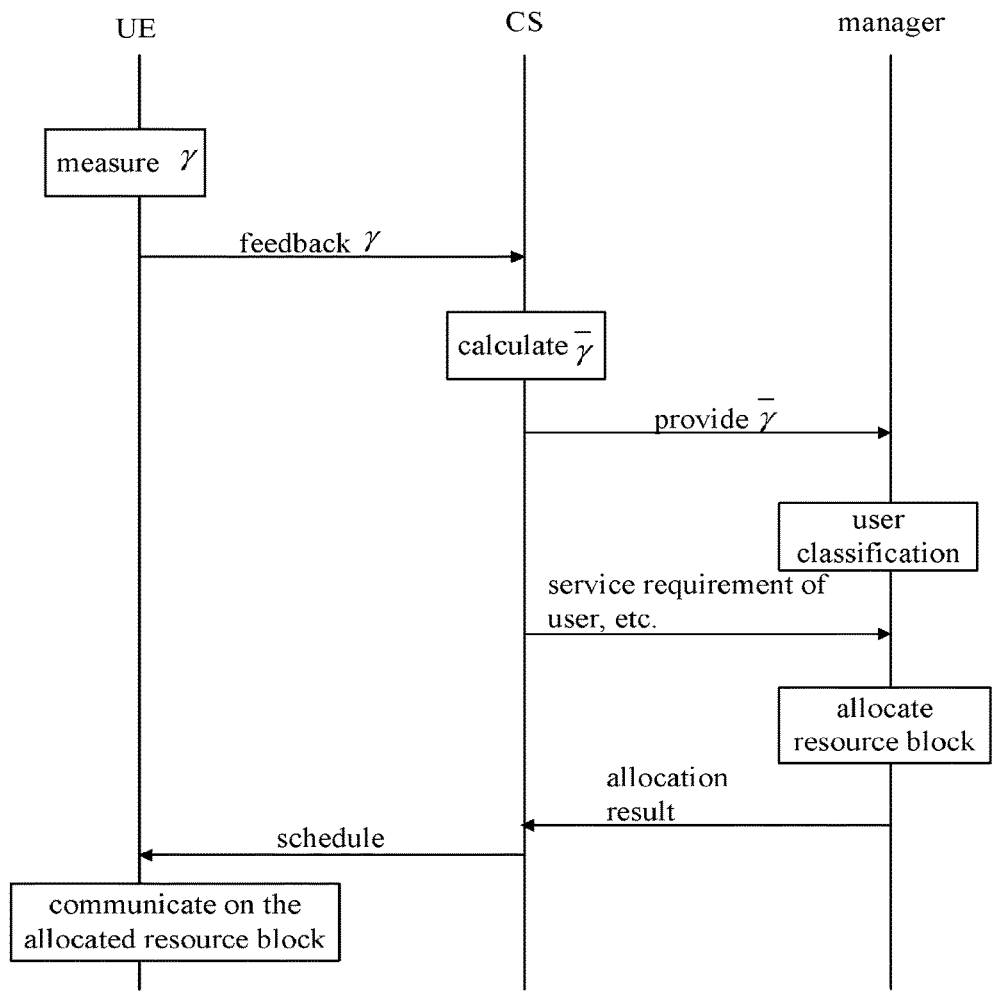
FIG. 7 is a sequence diagram illustrating interactions between base stations and interactions between a base station and a user equipment in a case that a wireless communication device according to an embodiment of the present disclosure is implemented as a base station.

FIG. 7 is a sequence diagram illustrating an interaction between a base station and a user equipment and an interaction between the base station and the wireless communication device 600 (manager) in a case that the wireless communication device 600 according to the embodiment of the present disclosure is arranged separately from the base station (in other words, implemented as a manager of the cell cluster). A cell CS represents each of the cells in a cell cluster, and UE represents a user equipment served by the cell CS. The user equipment UE measures a SINR γ which can characterize the quality of downlinks to the user equipment UE, and feeds γ back to a base station of its serving cell. The base station may calculate an average value $\bar{\gamma}$ of SINRs received in the predetermined time period and provide the obtained average value to a manager. Alternatively, the base station may directly provide the SINRs fed back from the user equipment to the manager, and the manager calculates the average value of the SINRs centrally. Then, the manager may classify the user equipment based on the calculated average value.

In an example, the classification unit 601 may be configured to: classify the user equipment into a first type (also referred to as a type of "good" hereinafter) in a case that the average SINR is much greater than 1; classify the user equipment into a second type (also referred to as a type of "bad" hereinafter) in a case that the average SINR is much less than 1; and classify the user equipment into a third type (also referred to as a type of "normal" hereinafter) in a case that the average SINR is neither much greater than nor much less than 1.

In a specific implementation, predetermined threshold Th3 and Th4 (Th3<Th4) may be set previously. If the average SINR $\bar{\gamma}$>Th4, it is considered that $\bar{\gamma}$>>1 and the user equipment is determined to be in the first type. If $\bar{\gamma}$<Th3, it is considered that $\bar{\gamma}$<<1 and the user equipment is determined to be in the second type. If Th3≤$\bar{\gamma}$≤Th4, it is considered that $\bar{\gamma}$ is neither much greater than nor much less than 1, and the user equipment is determined to be in the third type. For example, Th3 and Th4 may have the same values as Th1 and Th2 respectively. For example, Th3=0.5 and Th4=5.

In an example, if a cell cluster includes totally 12 user equipments UE1 to UE12, and Th3=1 and Th4=10, then classification results of the user equipments are as shown in Table 1:

TABLE 1

| USER EQUIPMENT | $\bar{\gamma}$ | TYPE |
| --- | --- | --- |
| UE1 | 0.4 | bad |
| UE2 | 0.3 | bad |
| UE3 | 5 | normal |
| UE4 | 11 | good |
| UE5 | 0.8 | bad |
| UE6 | 4.2 | normal |
| UE7 | 10.8 | good |
| UE8 | 0.6 | bad |
| UE9 | 3.5 | normal |
| UE10 | 4.6 | normal |
| UE11 | 7.8 | normal |
| UE12 | 13.4 | good |

After the classification unit 601 classifies the user equipment UE based on the average channel quality in the predetermined time period, the allocating unit 602 may allocate a resource block set to the user equipment at least partly based on the type of the user equipment. In the embodiment, the allocating unit 602 may allocate a same resource block set for user equipments of the same classification. For example, in a case of totally having 50 resource blocks, as shown in FIG. 2, user equipments of the type of "bad" may be allocated with resource blocks RB1 to RB10, user equipments of the type of "normal" may be allocated with resource blocks RB15 to RB40, and user equipments of the type of "good" may be allocated with resource blocks RB41 to RB50.

TABLE 2

| Type of user equipment | RB |
| --- | --- |
| BAD | RB1~RB10 |
| NORMAL | RB15~RB40 |
| GOOD | RB41~RB50 |

Table 2 shows an example of a resource block set allocation to the user equipments. In a specific implementation, the resource block set may be allocated to user equipments of the same type based on different requirements and using different criterions. For example, the allocating unit 602 may be configured to allocate a resource block set to a user equipment at least partly based on the numbers of user equipments of different types. Besides, for example, the allocating unit 602 may be further configured to allocate a resource block set at least partly based on service requirements of the user equipments of different types.

As shown in FIG. 7, in addition to the average value of the SINRs, the base station may further provide information such as service requirements of the user equipments to the manager. After classifying the user equipments, the manager may allocate resource block sets to the user equipments of different types by combining information such as the types of the user equipments, the numbers of the user equipments of different types, and the service requirements of the user equipments of different types. Then, the manager informs the base stations of the cells of an allocating result of resource block sets.

Upon receiving the allocating results of resource block set, the base station schedules user equipments of a corresponding type on a resource block based on the allocating result. In this way, the user equipment UE communicates on the allocated resource block.

It should be noted that, the timing sequence of measuring, feeding back and providing related parameters and the timing sequence of operations such as classification, calculation and determination shown in FIG. 7 are only examples without intending to limit the present disclosure, and can be adjusted in any ways as needed. In addition, a subject performing the operations such as classification, calculation and determination may be changed as needed.

The control unit 603 is configured to perform a control to determine a target transmission power of the target cell on the specific resource block by a power allocating method adaptive to a classification of a user equipment $UE_i^k$ scheduled by the target cell $CS_i$, (a cell on which a power control is to be performed) on the specific resource block k.

In view of different system requirements such as a requirement of maximizing a system throughput or a requirement of ensuring an accurate reception of a signal transferred under a bad channel quality, the control unit 603 may be configured to determine the target transmission power of the target cell $CS_i$, on the specific resource block k by different power allocating methods. For example, in a case that a user equipment even classified as the type of "bad" needs to be ensured to receive a downlink signal reliably, the control unit 603 may be configured to determine power of the target cell on the resource blocks allocated to user equipments of different types in such a way that the power determined with a power determination method for a resource block occupied by user equipments of the type of "bad" is higher than the power determined with a power determination method for a resource block occupied by user equipments of the type of "good". The specific method may be determined by those skilled in the art as needed.

Figure 8:
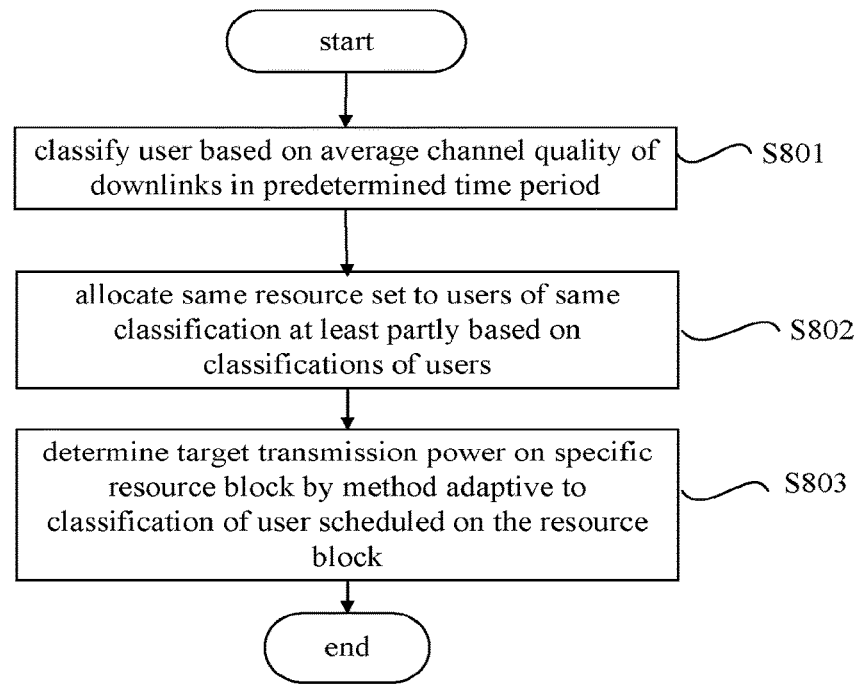
FIG. 8 is a flowchart illustrating a process of a wireless communication method according to another embodiment of the present disclosure.

FIG. 8 is a flowchart illustrating a process of a wireless communication method according to an embodiment of the present disclosure. In step S801, a user equipment is classified based on average channel quality of downlinks to the user equipment in a cell cluster in a predetermined time period. In step S802, a resource block set is allocated to the user equipment at least partly based on a classification of the user equipment, wherein a same resource block set is allocated to user equipments of the same classification. And in step S803, a control is performed to determine a target transmission power of the target cell on the specific resource block by a power allocating method adaptive to a classification of the user equipment scheduled by the target cell on the specific resource block. The details of the respective steps have been described in conjunction with the wireless communication device 600 above, and thus are not described herein.

Figure 9:
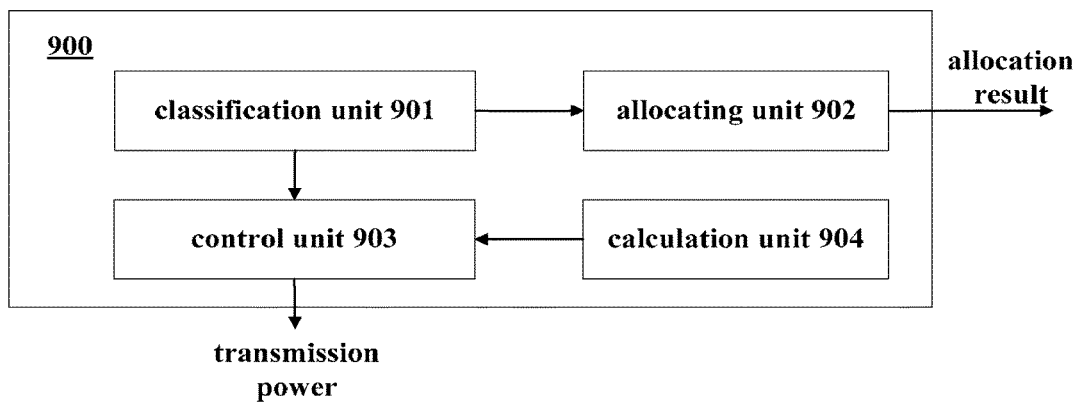
FIG. 9 is a block diagram illustrating a functional configuration of a wireless communication device according to another embodiment of the present disclosure.

FIG. 9 is a block diagram illustrating a functional configuration of a wireless communication device 900 according to an embodiment of the present disclosure. The wireless communication device 900 includes: a classification unit 901, an allocating unit 902, a control unit 903 and a calculation unit 904. Functions and structures of the classification unit 901 and the allocating unit 902 are the same as those of the classification 601 and the allocating unit 602 described in conjunction with FIG. 6, and thus are not described in detail hereinafter.

The calculation unit 904 calculates inter-cell SINRs of the target cell $CS_i$, with respect to each non-target cell $CS_j$ (j=1, 2, ..., N and j≠i) on a specific resource block k, which is referred to as "inter-cell SINR" hereinafter. Inter-cell SINR is defined as a ratio of interference of the target cell on a certain non-target cell versus a sum of all interference and noise the non-target cell is subjected to, on a certain resource block. An inter-cell SINR $\lambda_{i,j}^k$ of the target cell $CS_i$ to the user equipment $UE_j^k$ scheduled by the non-target cell $CS_j$ on the resource block k may be represented with the above formula (1), and thus is not described repeatedly herein. The inter-cell SINR $\lambda_{i,j}^k$ may be calculated based on received power at the user equipment $UE_j^k$ from a transmission of the cell $CS_i$, which is obtained by the user equipment $UE_j^k$ via a measurement, and a sum of received power on the user equipment $UE_j^k$ from transmissions of each of cells other than the non-target cell $CS_j$ on the resource block k, which is obtained by the user equipment $UE_j^k$ via a measurement.

After calculating the inter-cell SINR of the target cell $CS_i$ with respect to each non-target cell $CS_j$ on the resource block k, the calculation unit 904 may further calculate a sum of the inter-cell SINRs of the target cell $CS_i$ with respect to all of the non-target cells $CS_j$ (j=1, 2, ..., N and j≠i). The sum may be represented as $$\sum_{j \neq i} \lambda_{i,j}^k.$$

The calculated sum of the inter-cell SINRs, $$\sum_{j \neq i} \lambda_{i,j}^k,$$

may be used in a power allocating solution described below.

The control unit 903 may be configured, based on the object of maximizing a system throughput, to perform a control to determine whether the sum of the inter-cell SINRs, $$\sum_{j \neq i} \lambda_{i,j}^k,$$

is less than 1 in a case that the user equipment $UE_i^k$ is of the type of good ("the first type"); and determine a target transmission power by decreasing, by a certain step length, the transmission power $p_i^k$ of the target cell $CS_i$, on the resource block k if it is determined that the sum of the inter-cell SINRs, $$\sum_{j \neq i} \lambda_{i,j}^k,$$

is not less than 1; or determine a target transmission power of the target cell $CS_i$ on the specific resource block k by making a first-order partial derivative of a total throughput $R^k$ of cells in the cell cluster on the resource block k with respect to the transmission power $p_i^k$ of the target cell $CS_i$ on the specific resource block k equal to 0, if it is determined that the sum of the inter-cell SINRs, $$\sum_{j \neq i} \lambda_{i,j}^k,$$

is less than 1.

Actually, the wireless communication device 900 corresponds to the wireless communication device 300 described above in conjunction with the FIG. 3 in that: the wireless communication device 300 selects a proper power determination method based on a classification (for example, by comparing $\gamma_i^k$ and $\gamma_j^k$ respectively with 1) of an overall channel quality; while the wireless communication device 900 classifies the user equipment based on a channel quality of downlinks on a whole frequency band, then allocates a same resource block set to user equipments of the same classification, and selects a proper power determination method based on the classifications of the user equipments. Actually, the user equipment classification and resource block allocating performed by the latter wireless communication device ensures, in a probability as high as possible, that downlinks to the user equipments scheduled by different serving cells on the same resource block have similar quality. That is to say, in a case that the quality of the downlink is characterized with a SINR, the user equipment classification and resource block allocating performed by the latter wireless communication device ensure, in a probability as high as possible, that a comparison result between $\gamma_i^k$ and 1 is the same as a comparison result between $\gamma_j^k$ and 1 (for example, $\gamma_i^k$ and $\gamma_j^k$ are both much greater than 1, or both much less than 1).

Therefore, in an embodiment, the control unit 903 may also be configured to perform a control to determine the target transmission power of the target cell $CS_i$ on the resource block k by making the first-order partial derivative of the total throughput $R^k$ of all the cells in the cell cluster on the resource block k with respect to the transmission power $p_i^k$ of the target cell $CS_i$ on the specific resource block k equal to 0, in a case that the user equipment is of the type of "bad" ("the second type"), that is, in a high probability, $\gamma_i^k$ of the user equipment $UE_i^k$ and $\gamma_j^k$ of a user equipment $UE_j^k$ scheduled on the same resource block k as the user equipment $UE_i^k$ are both much less than 1.

If the user equipment $UE_i^k$ is of the type of "normal" ("the third type"), it can be seen that, in a high probability, the quality of downlinks to the user equipment and the quality of downlinks to a user equipment $UE_j^k$ scheduled on the same resource block k as the user equipment $UE_i^k$ are both normal. For example, the SINRs $\gamma_i^k$ and $\gamma_j^k$ may both be neither much greater than 1 nor much less than 1. In this case, similar to the wireless communication device 300, the calculation unit 904 of the wireless communication device 900 may be configured to compare values of first-order and second-order partial derivatives of the total throughput $R^k$ of all of the cells in the cell cluster on the resource block k with respect to the transmission power $p_i^k$ of the target cell $CS_i$ on the resource k with zero. And the control unit 903 may be configured to determine the target transmission power of the target cell $CS_i$ on the resource block k by making the first-order partial derivative equal to 0, in a case that the user equipment is of the type of "normal" ("the third type") and it is determined by the calculation unit 904 via the comparison that the value of the first-order partial derivative is greater than 0 and the value of the second-order partial derivative is less than 0.

Alternatively, the control unit 903 may be configured to determine a target transmission power by decreasing, by a certain step length, transmission power of a target cell on a specific resource block in a case that the user equipment is of the type of "normal" ("the third type") and it is determined by the calculation unit 904 via the comparison that the value of the first-order partial derivative is less than 0.

In the following, still taking the embodiment in which the wireless communication device 900 is implemented as a network manager as an example, a data transfers between a user equipment and a cell base station and between a cell base station and the manager, in a wireless communication system using the power allocating solution according to the present disclosure are described in conjunction with FIG. 10.

Figure 10:
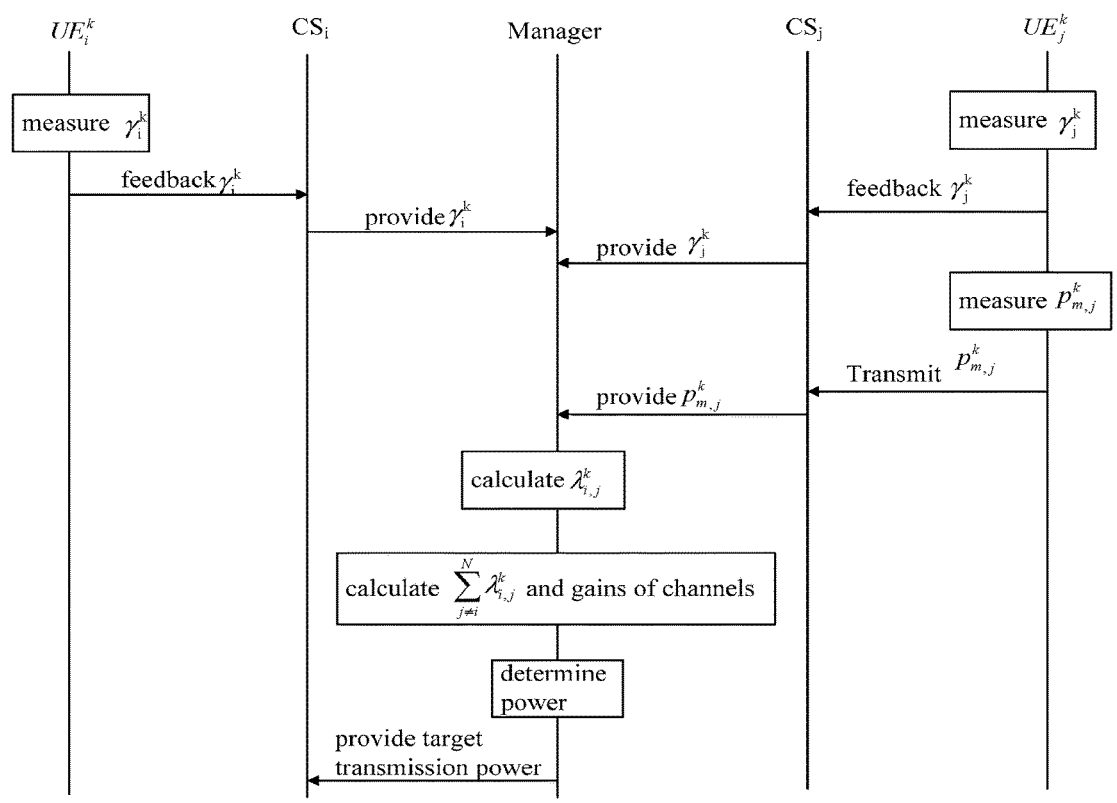
FIG. 10 is a sequence diagram illustrating a data transfer between a user equipment and a base station and a data transfer between a base station and a manager in a case that a wireless communication device according to an embodiment of the present disclosure is implemented as the manager.

FIG. 10 is a sequence diagram illustrating data transfers between a user equipment and a base station and between a base station and a manager in a case that the wireless communication device 900 is implemented as a manager according to the embodiment of the present disclosure. Transfers and operations shown in FIG. 10 are performed following the resource block allocating operation shown in FIG. 7. In other words, as compared with FIG. 7, user equipments in FIG. 10 have been scheduled on specific resource blocks (k) adaptive to types of the user equipments.

The embodiment shown in FIG. 10 differs from the embodiment shown in FIG. 5 in that: in the embodiment shown in FIG. 10, it is unnecessary to determine an overall downlinks since types of the user equipments have been determined; in addition the operations of calculating the inter-cell SINR $\lambda_{i,j}^k$, the sum of inter-cell SINRs, $$\sum_{j\neq i}^{N} \lambda_{i,j}^k,$$

and various gains (such as $g_{i,j}^k$, $g_{i,i}^k$ and $g_{j,j}^k$) are all done at the manager. And the operation of determining the target transmission power of the target cell $CS_i$ is done at the manager. Then, the target cell $CS_i$ is informed of the determined target transmission power.

Due to these differences, the data transfer is changed accordingly. For example, after a user equipment $UE_j^k$ of a non-target cell $CS_j$ delivers to the cell $CS_j$ the measured received power $p_{m,j}^k$ (m=1, 2, . . . , N and m≠j) which are received from all cells other than the cell $CS_j$, the cell $CS_j$ provides the received power to the manager for calculating by the manager the sum of inter-cell SINRs, $$\sum_{j\neq i}^{N} \lambda_{i,j}^k,$$

and various gains.

The operation of "determining the power" performed in the manager generally includes: all operations in the above control unit 903, and the operations in the calculation unit 904 of calculating the values of the first-order partial derivative $$\frac{\partial R^k}{\partial p_i^k}$$

and the second-order partial derivative $$\frac{\partial^2 R^k}{\partial (p_i^k)^2},$$

comparing the values of the first-order and second-order partial derivatives with zero, and the like.

It should be noted that, the timing sequence of measuring, feeding back and providing related parameters and the timing sequence of operations such as calculation and determination shown in FIG. 10 are only examples without intending to limit the present disclosure, and can be adjusted in any ways as needed. In addition, in a case that the wireless communication device 900 is implemented as a base station (being included in a base station), similar data transmission is made between a user equipment and the base station and between base stations.

Figure 11:
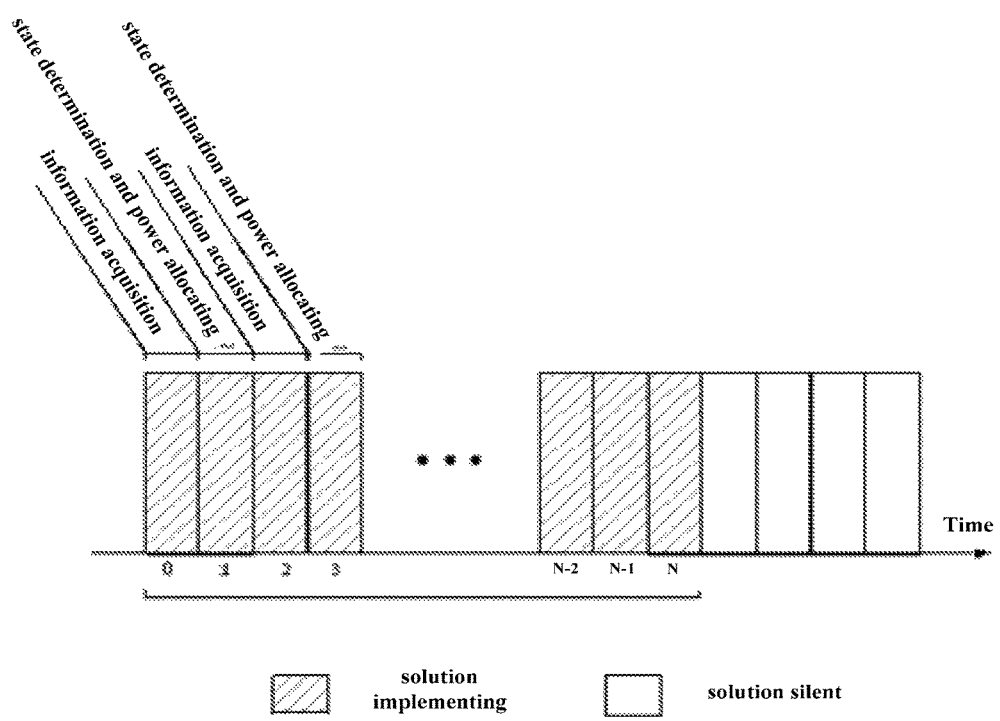
FIG. 11 is a sequence diagram illustrating an implementation of a power allocating solution according to the present disclosure in a wireless communication network.

FIG. 11 is a sequence diagram illustrating an implementation of a power allocating solution according to the present disclosure in a wireless communication network. As shown in FIG. 11, in a time period of implementing the solution, the power allocating solution according to the present disclosure, a state determination and a power allocating are performed based on information acquired in preceding time, and subsequently, the information acquisition, state determination and power allocating are performed iteratively.

With the wireless communication devices and the wireless communication method corresponding to the operations performed by the wireless communication devices described above, a user equipment may be classified based on average quality of downlinks in a predetermined time period, and a same resource block set is provided to user equipments of the same classification in a cell cluster. Then, a target transmission power of the target cell on a specific resource block is determined by a power allocating method adaptive to the type of the user equipment, thereby maximizing a system throughput of a wireless network on the specific resource block under a dense small cell deployment.

Furthermore, a computer program may be created, which enable hardware (such as Central Processing Unit (CPU), a Read-Only Memory (ROM) and a Random Access Memory (RAM)) mounted in a base station, a communication terminal or a network manager to perform functions equivalent to those of parts of the base station, the communication terminal or the network manager. In addition, a storage medium storing the computer program is also provided.

In the above description of the embodiments of the present disclosure, a feature described and/or shown for an embodiment may be used in one or more other embodiments in a same or similar manner, and may be combined with a feature of another embodiments or replace a feature of another embodiment.

It should be noted that, the term "include/contain", when used in the present disclosure, is to specify the presence of a feature, an element, a step or a component, but do not exclude the presence or addition of one or more other features, elements, steps or components.

In addition, the method according to the present disclosure is not limited to be performed in the time order described in the description, and may be performed sequentially, in parallel or independently in other time orders. Therefore, the technical scope of the present disclosure is not limited to the performing order of the method described in the specification.

In the above, the present disclosure is disclosed with the descriptions of the embodiments thereof. However, it should be understood that, various modifications, improvements or equivalents thereof may be designed for the present disclosure by those skilled in the art within the spirit and scope of the appended claims. These modifications, improvements or equivalents thereof should be considered to fall within the protection scope of the present disclosure.

The following embodiments are further described in the present disclosure:

1. A wireless communication device, including:
a classification unit, configured to classify, based on channel qualities of downlinks of a target cell and other cells in a cell cluster on a specific resource block, an overall channel quality; and
a control unit, configured to perform a control to determine a target transmission power of the target cell on the specific resource block by a power allocating method adaptive to a classification of the overall channel quality.

2. The wireless communication device according to embodiment 1, wherein according to a predetermined classification criterion, the classification of the overall channel quality includes: good, normal, and bad.

3. The wireless communication device according to embodiment 2, wherein each of the channel qualities is characterized by a SINR.

4. The wireless communication device according to embodiment 3, wherein the predetermined classification criterion includes:
the overall channel quality is classified as good in a case that SINRs of the target cell and the other cells are all much greater than 1;
the overall channel quality is classified as bad in a case that SINRs of the target cell and the other cells are all much less than 1; and
the overall channel quality is classified as normal in other cases.

5. The wireless communication device according to any one of embodiments 1-4, further including a calculation unit, wherein the calculation unit is configured to calculate an inter-cell SINR of the target cell with respect to a first other cell on the specific resource block, and the inter-cell SINR is defined as: a ratio of the interference on the first other cell from the target cell versus a sum of all interference and noise the first other cell is subjected to, on the specific resource block.

6. The wireless communication device according to embodiment 5, wherein the calculation unit is further configured to calculate a sum of inter-cell SINRs of the target cell with respect to all of the other cells in the cell cluster on the specific resource block.

7. The wireless communication device according to embodiment 6, wherein the control unit is configured to performed the control to determine whether the sum of the inter-cell SINRs is less than 1 if the overall channel quality is classified as good, and determine the target transmission power by decreasing, by a certain step length, transmission power of the target cell on the specific resource block if it is determined that the sum of the inter-cell SINRs is not less than 1.

8. The wireless communication device according to embodiment 6 or 7, wherein the control unit is configured to perform a control to determine whether the sum of the inter-cell SINRs is less than 1 if the overall channel quality is classified as good; and determine the target transmission power of the target cell on the specific resource block by making a first-order partial derivative of a total throughput of all cells in the cell cluster on the specific resource block with respect to the transmission power of the target cell on the specific resource block equal to 0 if it is determined that the sum of the inter-cell SINRs is less than 1.

9. The wireless communication device according to any one of embodiments 2-8, wherein the control unit is configured to perform a control to determine the target transmission power of the target cell on the specific resource block by making a first-order partial derivative of a total throughput of all cells in the cell cluster on the specific resource block with respect to the transmission power of the target cell on the specific resource block equal to 0 if the overall channel quality is classified as bad.

10. The wireless communication device according to any one of embodiments 2-9, wherein the calculation unit is further configured to compare values of first-order and second-order partial derivatives of a total throughput of all cells in the cell cluster on the specific resource block with respect to the transmission power of the target cell on the specific resource block with zero; and
the control unit is configured to perform a control to determine the target transmission power of the target cell on the specific resource block by making the first-order partial derivative equal to 0, in a case that the overall channel quality is classified as normal and it is determined by the calculation unit via the comparison that the value of the first-order partial derivative is greater than 0 and the value of the second-order partial derivative is less than 0.

11. The wireless communication device according to embodiment 10, wherein the control unit is configured to perform a control to determine the target transmission power of the target cell on the specific resource block by decreasing, by a certain step length, the transmission power of the target cell on the specific resource block, in a case that the overall channel quality is classified as normal and it is determined by the calculation unit via the comparison that the value of the first-order partial derivative is less than 0.

12. The wireless communication device according to any one of embodiments 8-11, wherein the first-order partial derivative is represented as $$\frac{\partial R^k}{\partial p_i^k},$$

wherein $$R^k = \sum_{i=1}^{N} \log_2\left(1 + \frac{p_i^k g_{i,i}^k}{\sum_{j \neq i, j=1}^{N} p_j^k g_{j,i}^k + \sigma^2}\right)$$

represents the total throughput of all the cells in the cell cluster on the specific resource block k, $p_i^k$ represents the transmission power of a cell $CS_i$ on the resource block k, $g_{i,j}^k$ represents a channel gain from a cell $CS_j$ to a user equipment in the cell $CS_i$ occupying the resource block k, $\sigma^2$ represents power of white Gaussian noise.

13. A wireless communication method, including:
classifying an overall channel quality based on channel qualities of downlinks of a target cell and other cells in a cell cluster on a specific resource block; and
perform a control to determine a target transmission power of the target cell on the specific resource block by a power allocating method adaptive to a classification of the overall condition.

14. The wireless communication method according to embodiment 13, wherein according to a predetermined classification criterion, the classification of the overall channel quality includes: good, normal, and bad.

15. The wireless communication method according to embodiment 14, wherein each of the channel qualities is characterized by a SINR.

16. The wireless communication method according to embodiment 15, wherein the predetermined classification criterion includes:
the overall channel quality is classified as good if SINRs of the target cell and the other cells are all much greater than 1;
the overall channel quality is classified as bad if SINRs of the target cell and the other cells are all much less than 1; and
the overall channel quality is classified as normal in other cases.

17. The wireless communication method according to any one of embodiments 13-16, further including: calculating an inter-cell SINR of the target cell with respect to a first other cell on the specific resource block, wherein the inter-cell SINR is defined as: a ratio of the interference on the first other cell from the target cell versus a sum of all interference and noise the first other cell is subjected to, on the specific resource block.

18. The wireless communication method according to embodiment 17, further including: calculating a sum of inter-cell SINRs of the target cell with respect to all of other cells in the cell cluster on the specific resource block.

19. The wireless communication method according to embodiment 18, wherein the controlling includes: determining whether the sum of the inter-cell SINRs is less than 1 in a case that the overall channel quality is classified as good; and determining the target transmission power by decreasing, by a certain step length, transmission power of the target cell on the specific resource block, if it is determined that the sum of the inter-cell SINRs is not less than 1.

20. The wireless communication method according to embodiment 18 or 19, wherein the controlling includes: determining whether the sum of the inter-cell SINRs is less than 1 in a case that the overall channel quality is classified as good; and determining the target transmission power of the target cell on the specific resource block by making a first-order partial derivative of a total throughput of all cells in the cell cluster on the specific resource block with respect to the transmission power of the target cell on the specific resource block equal to 0, if it is determined that the sum of the inter-cell SINRs is less than 1.

21. The wireless communication method according to any one of embodiments 14-20, wherein the controlling includes: determining the target transmission power of the target cell on the specific resource block by making a first-order partial derivative of a total throughput of all cells in the cell cluster on the specific resource block with respect to transmission power of the target cell on the specific resource block equal to 0, in a case that the overall channel quality is classified as bad.

22. The wireless communication method according to any one of embodiments 14-21, further including: comparing values of first-order and second-order partial derivatives of a total throughput of all cells in the cell cluster on the specific resource block with respect to transmission power of the target cell on the specific resource block with 0; and
the controlling includes: determining the target transmission power of the target cell on the specific resource block by making the first-order partial derivative equal to 0, in a case that the overall channel quality is classified as normal and it is determined via the comparison that the value of the first-order partial derivative is greater than 0 and the value of the second-order partial derivative is less than 0.

23. The wireless communication method according to embodiment 22, wherein the controlling includes: determining the target transmission power of the target cell on the specific resource block by decreasing, by a certain step length, the transmission power of the target cell on the specific resource block, in a case that the overall channel quality is classified as normal and it is determined by the comparison that the value of the first-order partial derivative is less than 0.

24. The wireless communication method according to any one of embodiments 20-23, wherein the first-order partial derivative is represented as $$\frac{\partial R^k}{\partial p_i^k},$$

wherein $$R^k = \sum_{i=1}^{N} \log_2\left(1 + \frac{p_i^k g_{i,i}^k}{\sum_{j \neq i, j=1}^{N} p_j^k g_{j,i}^k + \sigma^2}\right)$$

represents the total throughput of all the cells in the cell cluster on a specific resource block k, $p_i^k$ represents the transmission power of a cell $CS_i$ on the resource block k, $g_{i,j}^k$ represents a channel gain from a cell $CS_j$ to a user equipment in the cell $CS_i$ occupying the resource block k, and $\sigma^2$ presents power of white Gaussian noise.

25. A wireless communication device, including:
a classification unit, configured to classify a user equipment in a cell cluster based on average channel quality of downlinks to the user equipment in a predetermined time period;
an allocating unit, configured to allocate a resource block set to the user equipment at least partly based on the classification of the user equipment, wherein the allocating unit allocates a same resource block set to user equipments of the same classification; and a control unit, configured to perform a control to determine a target transmission power of a target cell on a specific resource block by a power allocating method adaptive to a classification of the user equipment scheduled by the target cell on the specific resource block.

26. The wireless communication device according to embodiment 25, wherein the average channel quality is characterized by an average SINR of the user equipment in the predetermined time period.

27. The wireless communication device according to embodiment 26, wherein the classification unit is configured to:

classify the user equipment into a first type if the average SINR is much greater than 1;

classify the user equipment into a second type if the average SINR is much less than 1; and classify the user equipment into a third type if the average SINR is neither much greater than 1 nor much less than 1.

28. The wireless communication device according to any one of embodiments 25 to 27, wherein the allocating unit allocates the resource block set to the user equipment at least partly based on the numbers of user equipments of different types.

29. The wireless communication device according to embodiment 28, wherein the allocating unit allocates the resource block set at least partly based on service requirements of the user equipments of different classifications.

30. The wireless communication device according to embodiment 29, further including: a calculation unit, wherein the calculation unit is configured to calculate an inter-cell SINR of the target cell with respect to a first non-target cell on the specific resource block, wherein the inter-cell SINR is defined as: a ratio of the interference on the first non-target cell from the target cell versus a sum of all interference and noise the first non-target cell is subjected to, on the specific resource block.

31. The wireless communication device according to embodiment 30, wherein the calculation unit is further configured to calculate a sum of inter-cell SINRs of the target cell with respect to all non-target cells in the cell cluster.

32. The wireless communication device according to embodiment 31, wherein the control unit is configured to: determine whether the sum of the inter-cell SINRs is less than 1 in a case that the user equipment is classified into the first type; and determine the target transmission power of the target cell on the specific resource block by making a first-order partial derivative of a total throughput of all cells in the cell cluster on the specific resource block with respect to transmission power of the target cell on the specific resource block equal to 0, if it is determined that the sum of the inter-cell SINRs is less than 1.

33. The wireless communication device according to embodiment 31 or 32, wherein the control unit is configured to: determine whether the sum of the inter-cell 1 SINRs is less than 1 in a case that the user equipment is classified into the first type; and determine the target transmission power by decreasing, by a certain step length, transmission power of the target cell on the specific resource block, if the sum of the inter-cell signal to interference plus noise is not less than 1.

34. The wireless communication device according to any one of embodiments 27 to 33, wherein the control unit is configured to: determine the target transmission power of the target cell on the specific resource block by making a first-order partial derivative of a total throughput of all cells in the cell cluster on the specific resource block with respect to the transmission power of the target cell on the specific resource block equal to 0, if the user equipment is classified into the second type.

35. The wireless communication device according to any one of embodiments 27 to 34, wherein the calculation unit is further configured to compare values of first-order and second-order partial derivatives of a total throughput of all cells in the cell cluster on the specific resource block with respect to the transmission power of the target cell on the specific resource block with 0; and the control unit is configured to determine the target transmission power of the target cell on the specific resource block by making the first-order partial derivative equal to 0, in a case that the user equipment is classified into the third type and it is determined by the calculation unit via the comparison that the value of the first-order partial derivative is greater than 0 and the value of the second-order partial derivative is less than 0.

36. The wireless communication device according to embodiment 35, wherein the control unit is configured to determine the target transmission power of the target cell on the specific resource block by decreasing, by a certain step length, the transmission power of the target cell on the specific resource block, in a case that the user equipment is classified into the third type and it is determined by the calculation unit via the comparison that the value of the first-order partial derivative is less than 0.

37. A wireless communication method, including:

classifying a user equipment in a cell cluster based on average channel quality of downlinks to the user equipment in a predetermined time period;

allocating a resource block set to the user equipment at least partly based on a classification of the user equipment, wherein a same resource block set is allocated to user equipments of the same classification; and performing a control to determine a target transmission power of a target cell on a specific resource block by a power allocating method adaptive to a classification of the user equipment scheduled by the target cell on the specific resource block.

38. The wireless communication method according to embodiment 37, wherein the average channel quality is characterized by an average SINR of the user equipment in the predetermined time period.

39. The wireless communication method according to embodiment 38, wherein the classifying includes:

classifying the user equipment into a first type if the average SINR is much greater than 1;

classifying the user equipment into a second type if the average SINR is much less than 1; and classifying the user equipment into a third type if the average SINR is neither much greater than 1 nor much less than 1.

40. The wireless communication method according to any one of embodiments 37 to 39, wherein the resource block set is allocated to the user equipment at least partly based on the numbers of user equipments of different types.

41. The wireless communication method according to embodiment 40, wherein the resource block set is allocated at least partly based on service requirements of the user equipments of different types.

42. The wireless communication method according to embodiment 41, further including: calculating an inter-cell SINR of the target cell with respect to a first non-target cell on the specific resource block, wherein the inter-cell SINR is defined as: a ratio of the interference on the first non-target cell from the target cell versus a sum of all interference and noise the first non-target cell is subjected to, on the specific resource block.

43. The wireless communication method according to embodiment 42, further including: calculating a sum of inter-cell SINRs of the target cell with respect to all of non-target cells in the cell cluster.

44. The wireless communication method according to embodiment 43, wherein the controlling includes: determining whether the sum of the inter-cell SINRs is less than 1 in a case that the user equipment is classified into the first type; and determining the target transmission power of the target cell on the specific resource block by making a first-order partial derivative of a total throughput of all cells in the cell cluster on the specific resource block with respect to transmission power of the target cell on the specific resource block equal to 0, if it is determined that the sum of the inter-cell SINRs is less than 1.

45. The wireless communication method according to embodiment 43 or 44, wherein the controlling includes: determining whether the sum of the inter-cell SINRs is less than 1 in a case that the user equipment is classified into the first type; and determining the target transmission power by decreasing, by a certain step length, transmission power of the target cell on the specific resource block, if it is determined that the sum of the inter-cell signal to interference plus noise is not less than 1.

46. The wireless communication method according to any one of embodiments 39 to 45, wherein the controlling includes: determining the target transmission power of the target cell on the specific resource block by making a first-order partial derivative of a total throughput of all cells in the cell cluster on the specific resource block with respect to transmission power of the target cell on the specific resource block equal to 0, if the user equipment is classified into the second type.

47. The wireless communication method according to any one of embodiments 39 to 46, further including: comparing values of first-order and second-order partial derivatives of a total throughput of all cells in the cell cluster on the specific resource block with respect to transmission power of the target cell on the specific resource block with 0; and the controlling includes: determining the target transmission power of the target cell on the specific resource block by making the first-order partial derivative equal to 0, in a case that the user equipment is classified into the third type and it is determined via the comparison that the value of the first-order partial derivative is greater than 0 and the value of the second-order partial derivative is less than 0.

48. The wireless communication method according to embodiment 47, wherein the controlling includes: determining the target transmission power of the target cell on the specific resource block by decreasing, by a certain step length, transmission power of the target cell on the specific resource block, in a case that the user equipment is classified into the third type and it is determined via the comparison that the value of the first-order partial derivative is less than 0.

49. A wireless communication system, including the wireless communication device according to any one of embodiments 1-12 and embodiments 25-36.

50. The wireless communication system according to embodiment 49, wherein the wireless communication device is arranged in a base station of the wireless communication system, or is arranged separately from the base station.

51. The wireless communication system according to embodiment 50, wherein a user equipment in the wireless communication system measures and provides received power received by the user equipment from all cells other than a serving cell of the user equipment.

The invention claimed is:

1. A wireless communication device operating in a wireless network including a plurality of small cells forming a small cell cluster, the wireless communication device comprising:
 a memory; and
 circuitry configured to
  receive, via the wireless network, a channel quality of a downlink for each user equipment that uses a specific resource block in each small cell of the plurality of small cells;
  classify an overall channel quality based on the received channel qualities of downlinks, on the specific resource block, of the plurality small cells including a target small cell and other small cells in the small cell cluster; and
  control a target transmission power, on the specific resource block, of the target small cell using the classification of the overall channel quality so that the target small cell operates with the target transmission power, wherein
 according to a predetermined classification criterion, the classification of the overall channel quality comprises: good, normal, and bad,
 each of the channel qualities is characterized by a signal to interference plus noise ratio (SINR), and
 the predetermined classification criterion comprises:
  the overall channel quality is classified as good if SINRs of the target small cell and the other small cells are all much greater than 1;
  the overall channel quality is classified as bad if SINRs of the target small cell and the other small cells are all much less than 1; and
  the overall channel quality is classified as normal in other cases.

2. The wireless communication device according to claim 1, wherein the circuitry is further configured to calculate an inter-cell SINR of the target small cell with respect to a first other small cell on the specific resource block, wherein the inter-cell SINR is defined as: a ratio of the interference on the first other small cell from the target small cell versus a sum of all interference and noise the first other small cell is subjected to, on the specific resource block.

3. The wireless communication device according to claim 2, wherein the circuitry is further configured to calculate a sum of inter-cell SINRs of the target small cell with respect to all of other small cells in the small cell cluster on the specific resource block.

4. The wireless communication device according to claim 3, wherein the circuitry is further configured to control so as to: determine whether the sum of the inter-cell SINRs is less than 1 if the overall channel quality is classified as good; and determine the target transmission power by decreasing, by a certain step length, transmission power of the target small cell on the specific resource block if it is determined that the sum of the inter-cell SINRs is not less than 1.

5. A wireless communication method performed by a wireless communication device operating in a wireless network including a plurality of small cells forming a small cell cluster, the method comprising:

receiving, via the wireless network, a channel quality of a downlink for each user equipment that uses a specific resource block in each small cell of the plurality of small cells;

classifying, using circuitry of the wireless communication device, an overall channel quality based on the received channel qualities of downlinks, on the specific resource block, of the plurality of small cells including a target small cell and other small cells in a small cell cluster; and controlling a target transmission power, on the specific resource block, of the target small cell using the classification of the overall channel quality so that the target small cell operates with the target transmission power, wherein according to a predetermined classification criterion, the classification of the overall channel quality comprises: good, normal, and bad, each of the channel qualities is characterized by a signal to interference plus noise ratio (SINR), and the predetermined classification criterion comprises:
  the overall channel quality is classified as good if SINRs of the target small cell and the other small cells are all much greater than 1;
  the overall channel quality is classified as bad if SINRs of the target small cell and the other small cells are all much less than 1; and
  the overall channel quality is classified as normal in other cases.

6. A wireless communication device operating in a wireless network including a plurality of small cells forming a small cell cluster, the plurality of small cells including a target small cell, the wireless communication device comprising:
  a memory; and
  circuitry configured to:
    receive, via the wireless network during a predetermined time period, a measure of quality of downlinks to a user equipment;
    determine an average channel quality of downlinks based on the measure of quality of downlinks received during the predetermined time period;
    classify the user equipment in the small cell cluster based on the determined average channel quality of downlinks to the user equipment in the predetermined time period;
    allocate a resource block set to the user equipment at least partly based on the classification of the user equipment, wherein the resource block set is allocated to user equipments of the same classification; and
    control a target transmission power of a target small cell on a specific resource block using the classification of the user equipment scheduled by the target small cell on the specific resource block so that the target small cell operates with the target transmission power, wherein
  the average channel quality is characterized by an average SINR of the user equipment in the predetermined time period, and
  the circuitry is further configured to
    classify the user equipment into a first type if the average SINR is much greater than 1;
    classify the user equipment into a second type if the average SINR is much less than 1; and
    classify the user equipment into a third type if the average SINR is neither much greater than 1 nor much less than 1.

7. The wireless communication device according to claim 6, wherein the circuitry is further configured to allocate the resource block set to the user equipment at least partly based on the numbers of user equipments of different types.

8. The wireless communication device according to claim 7, wherein the circuitry is further configured to allocate the resource block set at least partly based on service requirements of the user equipments of different types.

9. The wireless communication device according to claim 8, wherein the circuitry is further configured to calculate an inter-cell SINR of the target small cell with respect to a first non-target small cell on the specific resource block, wherein the inter-cell SINR is defined as: a ratio of the interference on the first non-target small cell from the target small cell versus a sum of all interference and noise the first non-target small cell is subjected to, on the specific resource block.

10. The wireless communication device according to claim 9, wherein the circuitry is further configured to calculate a sum of inter-cell SINRs of the target small cell with respect to all of non-target small cells in the small cell cluster on the specific resource block.

11. The wireless communication device according to claim 10, wherein the circuitry is further configured to:
  determine whether the sum of the inter-cell SINRs is less than 1 if the user equipment is of the first type; and
  determine the target transmission power of the target small cell on the specific resource block, by making a first-order partial derivative of a total throughput of all small cells in the small cell cluster on the specific resource block with respect to transmission power of the target small cell on the specific resource block equal to 0, if it is determined that the sum of the inter-cell SINRs is less than 1.

12. The wireless communication device according to claim 10, wherein the circuitry is further configured to:
  determine whether the sum of the inter-cell SINRs is less than 1 if the user equipment is of the first type; and
  determine the target transmission power by decreasing, by a certain step length, transmission power of the target small cell on the specific resource block, if it is determined that the sum of the inter-cell SINRs is not less than 1.

13. The wireless communication device according to claim 6, wherein the circuitry is configured to: determine the target transmission power of the target small cell on the specific resource block by making a first-order partial derivative of a total throughput of all small cells in the small cell cluster on the specific resource block with respect to transmission power of the target small cell on the specific resource block equal to 0, if the user equipment is of the second type.

14. The wireless communication device according to claim 6, wherein the circuitry is further configured to respectively compare values of first-order and second-order partial derivatives of a total throughput of all cells in the cell cluster on the specific resource block with respect to transmission power of the target cell on the specific resource block with 0; and
  determine the target transmission power of the target cell on the specific resource block by making the first-order partial derivative equal to 0, in a case that the user equipment is of the third type and it is determined by the calculation unit via the comparison that the value of the first-order partial derivative is greater than 0 and the value of the second-order partial derivative is less than 0.

* * * * *